United States Patent
Hosaka et al.

(10) Patent No.: US 9,018,299 B2
(45) Date of Patent: Apr. 28, 2015

(54) COLORED FLUID AND MULTI-PHASE LIQUID COLORED COMPOSITION

(71) Applicant: DIC Corporation, Tokyo (JP)

(72) Inventors: Masaki Hosaka, Kita-adachi-gun (JP); Yukie Uemura, Kita-adachi-gun (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/236,770

(22) PCT Filed: Oct. 17, 2012

(86) PCT No.: PCT/JP2012/076827
§ 371 (c)(1),
(2) Date: Feb. 3, 2014

(87) PCT Pub. No.: WO2013/065485
PCT Pub. Date: May 10, 2013

(65) Prior Publication Data
US 2014/0374668 A1    Dec. 25, 2014

(30) Foreign Application Priority Data

Oct. 31, 2011 (JP) .................................. 2011-238728
Dec. 27, 2011 (JP) .................................. 2011-285589

(51) Int. Cl.
*G02B 26/00* (2006.01)
*C08F 220/34* (2006.01)
*G02B 1/06* (2006.01)
*G02B 5/23* (2006.01)

(52) U.S. Cl.
CPC ................................. *G02B 26/005* (2013.01)

(58) Field of Classification Search
CPC ............ G02B 26/00; G02B 1/06; G02B 5/23; G02F 1/03; C08F 220/34; C08F 220/14
USPC ........... 524/495; 359/296, 245, 665; 252/586, 252/511, 583
See application file for complete search history.

(56) References Cited

U.S. PATENT DOCUMENTS 8,717,663 B2 * 5/2014 Heikenfeld et al. .......... 359/296

FOREIGN PATENT DOCUMENTS

| JP | 10-039800 A | 2/1998 |
|---|---|---|
| JP | 10-074055 A | 3/1998 |
| JP | 2008-203282 A | 9/2008 |
| JP | 2009-210738 A | 9/2009 |
| JP | 2011-038016 A | 2/2011 |
| JP | 2011-510336 A | 3/2011 |
| WO | 2010/104604 A1 | 9/2010 |
| WO | 2010/104606 A1 | 9/2010 |
| WO | WO 2010104606 A1 * | 9/2010 |
| WO | 2011/017446 A1 | 2/2011 |

OTHER PUBLICATIONS

International Search Report dated Dec. 25, 2012, issued in corresponding application No. PCT/JP2012/076827.

* cited by examiner

*Primary Examiner* — Michael M Bernshteyn
(74) *Attorney, Agent, or Firm* — Westerman, Hattori, Daniels & Adrian, LLP

(57) ABSTRACT

An object of the present invention is to provide a colored liquid with superior separability from polar solvents for use with an electrowetting or electrofluidic device that uses a coloring agent added as a colorant to a nonpolar solvent. A colored liquid according to the present invention contains a nonpolar solvent and a colorant, and the colorant is a modified pigment containing a pigment (A) and a polymer (P) formed on a surface thereof by polymerizing a polymer (B) soluble in a nonaqueous solvent and at least one polymerizable unsaturated monomer (C) that is soluble in the nonaqueous solvent and that becomes insoluble or poorly soluble in the nonaqueous solvent after polymerization. A multi-phase liquid colored composition according to the present invention contains the colored liquid and a polar solvent immiscible with the colored liquid.

13 Claims, No Drawings

COLORED FLUID AND MULTI-PHASE LIQUID COLORED COMPOSITION

TECHNICAL FIELD

The present invention relates to colored liquids and multi-phase liquid colored compositions for use with modulation systems that move a liquid by means of an external electric field, particularly electrowetting devices and electrofluidic devices.

BACKGROUND ART

Modulation systems that move a liquid by means of an external electric field have been studied for use as image display devices and optical devices such as optical shutters, optical pickup devices, and liquid optical lenses. Typical modulation systems include electroosmosis systems, electrophoretic systems, electrofluidic systems, and electrowetting systems.

Among them, electrofluidic systems and electrowetting systems have been studied for use as low-power-consumption image display devices because they have high contrast ratios and wide viewing angles and require no frontlight or backlight. The mechanism, as discussed in PTLs 1 and 2, is as follows: based on the concept termed "electrocapillarity", a droplet of a colored liquid present in an uncolored liquid is spread or contracted (or a droplet of an uncolored liquid present in a colored liquid is spread or contracted) by applying or not applying a voltage, thereby forming a colored image.

Such a multi-phase liquid containing a colored liquid and an uncolored liquid (hereinafter referred to as "multi-phase colored liquid") generally contains a nonpolar solvent such as silicone oil and a polar solvent such as water, alcohol, or ethylene glycol because the two liquids need to be separated, i.e., immiscible, and a colorant is added to one of the solvents.

As an example of the addition of a colorant to a polar solvent, PTL 3 discloses the use of a colored liquid containing a polar solvent to which are added an ionic liquid containing a room-temperature molten salt composed of a combination of a cation and an anion and a self-dispersible pigment having a functional group such as a carboxyl, hydroxyl, carbonyl, sulfone, hydroxyl, or phosphate group. PTL 4 discloses the use of a colored liquid that contains a polar solvent having a particular viscosity and surface tension and having a pigment or dye added thereto and that has a particular electric conductivity and ionic radius.

As an example of the addition of a colorant to a nonpolar solvent, PTL 5 discloses the use of a colored liquid containing a nonpolar solvent such as decane, decalin, or tetralin to which are added an organic pigment and/or inorganic pigment, a solvent-soluble or solvent-dispersible polymer dispersant, and an aldehyde resin or ketone resin.

CITATION LIST

Patent Literature

PTL 1: Japanese Unexamined Patent Application Publication No. 10-39800
PTL 2: Japanese Unexamined Patent Application Publication No. 10-74055
PTL 3: Japanese Unexamined Patent Application Publication No. 2008-203282
PTL 4: International Publication No. WO2011/017446
PTL 5: Japanese Unexamined Patent Application Publication (Translation of PCT Application) No. 2011-510336

SUMMARY OF INVENTION

Technical Problem

An object of the present invention is to provide a colored liquid with superior separability from polar solvents for use with an electrowetting or electrofluidic device that uses a coloring agent added as a colorant to a nonpolar solvent, and also to provide a multi-phase liquid colored composition containing such a colored liquid.

Solution to Problem

The inventors have found a solution to achieve the above object through the use of a resin-coated coloring agent as a colorant.

Specifically, the present invention provides a colored liquid for use with a device having an optical modulation system that moves or deforms a liquid by means of an external electric field to modulate color or brightness. The colored liquid contains a nonpolar solvent and a colorant, and the colorant is a modified pigment containing a pigment (A) and a polymer (P) formed on a surface thereof by polymerizing a polymer (B) soluble in a nonaqueous solvent and at least one polymerizable unsaturated monomer (C) that is soluble in the nonaqueous solvent and that becomes insoluble or poorly soluble in the nonaqueous solvent after polymerization.

The present invention further provides a multi-phase liquid colored composition containing the colored liquid described above and a polar solvent immiscible with the colored liquid.

The present invention further provides use of the colored liquid described above as a colorant to form an image on a device having an optical modulation system that moves or deforms a liquid by means of an external electric field to modulate color or brightness.

Advantageous Effects of Invention

According to the present invention, there can be provided a colored liquid with superior separability from polar solvents for use with an electrowetting or electrofluidic device that uses a coloring agent added as a colorant to a nonpolar solvent and a multi-phase liquid colored composition containing such a colored liquid.

DESCRIPTION OF EMBODIMENTS

Nonpolar Solvent

The nonpolar solvent used in a colored liquid according to the present invention may be any known nonpolar solvent that is commonly used in electrowetting devices and electrofluidic devices. Specific examples of such nonpolar solvents include nonaqueous linear and/or branched or cyclic alkanes having 4 to 30 carbon atoms, preferably pentane, hexane, heptane, octane, nonane, decane, undecane, dodecane, cyclopentane, cyclohexane, cycloheptane, cyclooctane, and methylcyclohexane, particularly preferably decane, tetradecane, undecane, dodecane, and mixtures thereof in any ratio; linear and/or branched and/or cyclic haloalkanes having 1 to 30 carbon atoms, preferably dichloromethane, chloroform, tetrachloromethane, dichloroethane, trichloroethane, tetrachloroethane, chlorocyclohexane, and positional isomers thereof; aromatic compounds having 6 to 22 carbon atoms, preferably benzene, toluene, xylene, mesitylene, and mixtures thereof in any ratio; and hydrogenated aromatic compounds having 10 to 22 carbon atoms, preferably tetralin, cis-decalin, trans-decalin, and mixtures thereof in any ratio, particularly preferably cis-decalin and trans-decalin;

halogenated aromatic compounds having 6 to 22 carbon atoms, preferably chlorobenzene, fluorobenzene, dichlorobenzene, difluorobenzene, trichlorobenzene, trifluorobenzene, chloronaphthalene, fluoronaphthalene, and positional isomers thereof; linear and/or branched and/or cyclic alcohols having 4 to 22 carbon atoms, preferably butanol, pentanol, hexanol, heptanol, octanol, nonanol, decanol, undecanol, dodecanol, benzyl alcohol, phenylethanol, cyclopentanol, cyclohexanol, cycloheptanol, cyclooctanol, and positional isomers thereof; linear and/or branched and/or cyclic ethers, preferably diethyl ether, dipropyl ether, tert-butyl methyl ether, tert-amyl methyl ether, tert-amyl ethyl ether, dimethoxyethane, diethoxyethane, diglyme, triglyme, furan, tetrahydrofuran, tetrahydromethylfuran, dioxolane, tetrahydrothiophene, tetrahydropyran, dioxane, methoxybenzene, methylthiobenzene, ethoxybenzene, and positional isomers thereof;

linear and/or branched and/or cyclic ketones, preferably acetone, trichloroacetone, butanone, pentanone, hexanone, heptanone, octanone, nonanone, cyclopentanone, cyclohexanone, acetophenone, acetylacetone, and positional isomers thereof;

linear and/or branched and/or cyclic nitroalkanes, preferably nitromethane, nitroethane, nitrocyclohexane, and positional isomers thereof;

nitro aromatic compounds having 6 to 22 carbon atoms, preferably nitrobenzene; linear and/or branched and/or cyclic amines, preferably tert-butylamine, diaminoethane, diethylamine, triethylamine, tributylamine, pyrrolidine, piperidine, morpholine, N-methylaniline, N,N-dimethylaniline, and positional isomers thereof; silicone oils such as hexamethyldisilane, diphenyldimethylsilane, chlorophenyltrimethylsilane, phenyltrimethylsilane, phenethyl-tris(trimethylsiloxy)silane, phenyl-tris(trimethylsiloxy)silane, polydimethylsiloxane, tetraphenyltetramethyltrisiloxane, poly(3,3,3-trifluoropropylmethylsiloxane), 3,5,7-triphenylnonamethylpentasiloxane, 3,5-diphenyloctamethyltetrasiloxane, 1,1,5,5-tetraphenyl-1,3,3,5-tetramethyl-trisiloxane, and hexamethylcyclotrisiloxane; and hydrofluoroethers, chlorodifluoromethane, 1,1,1,2-tetrafluoroethane, pentafluoroethane, difluoromethane, trifluoromethane, 1,1,1,2,3,3,3-heptafluoropropane, 1,1-difluoroethane, 1,1,1,3,3,3-hexafluoropropane, octafluoropropane, and mixtures thereof in any ratio.

Particularly preferred are decane, dodecane, decalin, tetradecane, tetralin, polydimethylsiloxane, mixtures thereof, and solvents based on these materials.

Colorant

The colorant used in the present invention is a modified pigment prepared by polymerizing, in the presence of a pigment (A) and a polymer (B) soluble in a nonaqueous solvent, at least one polymerizable unsaturated monomer (C) that is soluble in the nonaqueous solvent and that becomes insoluble or poorly soluble in the nonaqueous solvent after polymerization. Specifically, the colorant is a modified pigment containing the pigment (A) and a polymer (P) formed on the surface thereof by polymerizing the polymer (B) soluble in the nonaqueous solvent and at least one polymerizable unsaturated monomer (C) that is soluble in the nonaqueous solvent and that becomes insoluble or poorly soluble in the nonaqueous solvent after polymerization.

"Polymer (P)" is a generic term for polymers with which the modified pigment is to be finally coated, specifically, a generic term for polymers of the polymer (B) and the polymerizable unsaturated monomer (C).

Colorant: Pigment (A)

The pigment (A) used in the present invention is at least one pigment selected from commonly known and used organic pigments and inorganic pigments. The present invention may be applied to either untreated pigments or treated pigments.

Examples of organic pigments include perylene and perinone compound pigments, quinacridone compound pigments, phthalocyanine compound pigments, anthraquinone compound pigments, phthalone compound pigments, dioxazine compound pigments, isoindolinone compound pigments, isoindoline compound pigments, diketopyrrolopyrrole compound pigments, insoluble azo compound pigments, soluble azo compound pigments, condensed azo compound pigments, and aniline black pigments. Specific examples of organic pigments are illustrated below.

Examples of perylene and perinone compound pigments include pigments such as C.I. Pigment Violet 29; C.I. Pigment Red 123, 149, 178, and 179; C.I. Pigment Black 31 and 32; and C.I. Pigment Orange 43.

Examples of quinacridone compound pigments include pigments such as C.I. Pigment Violet 19 and 42; C.I. Pigment Red 122, 202, 206, 207, 209, and 282; and C.I. Pigment Orange 48 and 49.

Examples of phthalocyanine compound pigments include pigments such as C.I. Pigment Blue 15, 15:1, 15:2, 15:3, 15:4, 15:6, and 16 and C.I. Pigment Green 7 and 36.

Examples of anthraquinone compound pigments include pigments such as C.I. Pigment Blue 60; C.I. Pigment Yellow 24 and 108; C.I. Pigment Red 168 and 177; and C.I. Pigment Orange 40.

Examples of phthalone compound pigments include pigments such as C.I. Pigment Yellow 138.

Examples of dioxazine compound pigments include pigments such as C.I. Pigment Violet 23 and 37.

Examples of isoindolinone compound pigments include pigments such as C.I. Pigment Yellow 109, 110, and 173 and C.I. Pigment Orange 61.

Examples of isoindoline compound pigments include pigments such as C.I. Pigment Yellow 139 and 185; C.I. Pigment Orange 66; and C.I. Pigment Brown 38.

Examples of diketopyrrolopyrrole compound pigments include pigments such as C.I. Pigment Red 254 and 255.

Examples of insoluble azo compound pigments include pigments such as C.I. Pigment Yellow 1, 3, 12, 13, 14, 17, 55, 73, 74, 81, 83, 97, 130, 151, 152, 154, 156, 165, 166, 167, 170, 171, 172, 174, 175, 176, 180, 181, and 188; C.I. Pigment Orange 16, 36, and 60; C.I. Pigment Red 5, 22, 31, 112, 146, 150, 171, 175, 176, 183, 185, 208, and 213; C.I. Pigment Violet 43 and 44; and C.I. Pigment Blue 25 and 26.

Examples of soluble azo compound pigments include pigments such as C.I. Pigment Red 53:1, 57:1, and 48.

Examples of condensed azo compound pigments include pigments such as C.I. Pigment Yellow 93, 94, 95, 128, and 166; C.I. Pigment Orange 31; C.I. Pigment Red 144, 166, 214, 220, 221, 242, 248, and 262; and C.I. Pigment Brown 41 and 42.

Examples of aniline black pigments include C.I. Pigment Black 1.

Examples of inorganic pigments include titanium oxide, zinc sulfide, white lead, zinc white, lithopone, antimony white, basic lead sulfate, basic lead silicate, barium sulfate, calcium carbonate, gypsum, silica, carbon black, iron black, titanium black, cobalt violet, vermilion, molybdenum orange, red lead, red ochre, chrome yellow, cadmium yellow, zinc chromate, yellow ocher, chromium oxide, ultramarine blue, Prussian blue, and cobalt blue.

Nonaqueous Solvent

The nonaqueous solvent used in the present invention is an organic solvent essentially containing an aliphatic and/or alicyclic hydrocarbon solvent. Examples of aliphatic and/or alicyclic hydrocarbon solvents include n-hexane, n-heptane, n-octane, n-nonane, n-decane, n-dodecane, isooctane, isononane, isodecane, isododecane, "LAWS" from Shell Chemical Co., "Isopar C", "Isopar E", "Isopar G", "Isopar H", "Isopar L", and "Isopar M" from ExxonMobil Chemical Co., "IP Solvent 1016", "IP Solvent 1620", "IP Solvent 2028", and "IP Solvent 2835" from Idemitsu Kosan Co., Ltd., and "MARUKASOL 8" from Maruzen Petrochemical Co., Ltd.

The aliphatic and/or alicyclic hydrocarbon solvent may be used as a mixture with other organic solvents provided that they do not interfere with the advantageous effects of the present invention. Specific examples of such organic solvents include aromatic hydrocarbon solvents such as toluene and xylene; esters such as methyl acetate, ethyl acetate, n-butyl acetate, and amyl acetate; ketones such as acetone, methyl ethyl ketone, methyl isobutyl ketone, methyl amyl ketone, and cyclohexanone; and alcohols such as methanol, ethanol, n-propanol, i-propanol, and n-butanol.

If a mixture is used, the aliphatic and/or alicyclic hydrocarbon solvent is preferably used in an amount of 50% by mass or more, more preferably 60% by mass or more.

Polymer (B) Soluble in Nonaqueous Solvent

The polymer (B), soluble in the nonaqueous solvent, used in the present invention preferably has the polymerizable unsaturated group so that it can be polymerized or crosslinked with the polymerizable unsaturated monomer (C), described later. An example of such a polymer is an acrylic resin (BF) having a polymerizable unsaturated group.

Acrylic Resin (BF) Having Polymerizable Unsaturated Group Soluble in Nonaqueous Solvent Specifically, the acrylic resin (BF), soluble in the nonaqueous solvent and having a polymerizable unsaturated group, used in the present invention refers to, for example, a copolymer of polymerizable unsaturated monomers containing a major proportion of an alkyl(meth)acrylate having an alkyl group with 4 or more carbon atoms and having a polymerizable unsaturated group introduced therein, or a macromonomer of a copolymer of polymerizable unsaturated monomers containing a major proportion of an alkyl(meth)acrylate having an alkyl group with 4 or more carbon atoms.

Examples of alkyl(meth)acrylates having an alkyl group with 4 or more carbon atoms include n-butyl(meth)acrylate, i-butyl(meth)acrylate, t-butyl(meth)acrylate, 2-ethylhexyl (meth)acrylate, lauryl(meth)acrylate, stearyl(meth)acrylate, isostearyl(meth)acrylate, and cyclohexyl(meth)acrylate.

Examples of polymerizable unsaturated monomers that can be used other than alkyl(meth)acrylates include aromatic vinyl monomers such as styrene, α-methylstyrene, p-t-butylstyrene, and vinyltoluene; (meth)acrylates such as benzyl (meth)acrylate, dimethylamino(meth)acrylate, diethylamino (meth)acrylate, dibromopropyl(meth)acrylate, and tribromophenyl(meth)acrylate; diesters of unsaturated dicarboxylic acids such as maleic acid, fumaric acid, and itaconic acid with monohydric alcohols; and vinyl esters such as vinyl benzoate, which can be used as a copolymer with the alkyl (meth)acrylates described above.

The polymerizable-unsaturated-group containing monomers that can be used other than alkyl(meth)acrylates are preferably used as a random polymer with alkyl(meth)acrylates because homopolymers of these monomers have low solubility in the nonaqueous solvent.

These polymerizable unsaturated monomers may be used alone or in combination. Particularly preferred are linear or branched alkyl(meth)acrylates having an alkyl group with 4 to 22 carbon atoms, such as n-butyl(meth)acrylate, 2-ethylhexyl(meth)acrylate, and lauryl methacrylate.

A copolymer of polymerizable unsaturated monomers containing a major proportion of an alkyl(meth)acrylate having an alkyl group with 4 or more carbon atoms can be prepared by polymerizing the polymerizable unsaturated monomers as usual.

The acrylic resin (BF) having a polymerizable unsaturated group can be prepared by introducing a polymerizable unsaturated group into the copolymer of polymerizable unsaturated monomers containing a major proportion of an alkyl (meth)acrylate having an alkyl group with 4 or more carbon atoms.

Examples of methods for introducing a polymerizable unsaturated group include a method including mixing and copolymerizing a carboxyl-containing polymerizable monomer, such as acrylic acid or methacrylic acid, or an amino-containing polymerizable monomer, such as dimethylaminoethyl methacrylate or dimethylaminopropylacrylamide, as a comonomer in advance to prepare a copolymer having a carboxyl or amino group and then reacting the carboxyl or amino group with a monomer having a glycidyl group and a polymerizable unsaturated group, such as glycidyl methacrylate;

a method including mixing and copolymerizing a hydroxyl-containing monomer such as 2-hydroxyethyl methacrylate or 2-hydroxyethyl acrylate as a comonomer in advance to prepare a copolymer having a hydroxyl group and then reacting the hydroxyl group with a monomer having an isocyanate group and a polymerizable unsaturated group, such as isocyanate ethyl methacrylate;

a method including introducing a carboxyl group into an end of a copolymer using thioglycolic acid as a chain transfer agent during polymerization and reacting the carboxyl group with a monomer having a glycidyl group and a polymerizable unsaturated group, such as glycidyl methacrylate; and a method including introducing a carboxyl group into a copolymer using a carboxyl-containing azo initiator such as azobiscyanopentanoic acid as a polymerization initiator and reacting the carboxyl group with a monomer having a glycidyl group and a polymerizable unsaturated group, such as glycidyl methacrylate.

In particular, the method including copolymerizing a carboxyl-containing monomer, such as acrylic acid or methacrylic acid, or an amino-containing monomer, such as dimethylaminoethyl methacrylate or dimethylaminopropylacrylamide, in advance and then reacting the carboxyl or amino group with a monomer having a glycidyl group and a polymerizable unsaturated group, such as glycidyl methacrylate, is most convenient and preferred.

Polymerizable Unsaturated Monomer (C) that is Soluble in Nonaqueous Solvent and that Becomes Insoluble or Poorly Soluble in Nonaqueous Solvent after Polymerization Specific examples of polymerizable unsaturated monomers (C) used in the present invention that are soluble in the nonaqueous solvent and that become insoluble or poorly soluble in the nonaqueous solvent after polymerization include vinyl monomers having no reactive polar group (functional group), including olefins such as methyl(meth) acrylate, ethyl(meth)acrylate, n-propyl(meth)acrylate, i-propyl(meth)acrylate, (meth)acrylonitrile, vinyl acetate, vinyl chloride, vinylidene chloride, vinyl fluoride, and vinylidene fluoride; amide-containing vinyl monomers such as (meth)acrylamide, dimethyl(meth)acrylamide, N-t-butyl(meth)acrylamide, N-octyl(meth)acrylamide, diacetoneacrylamide, dimethylaminopropylacrylamide, and alkoxylated N-methylolated(meth)acrylamides; dialkyl[(meth)acryloyloxyalkyl] phosphates, (meth)acryloyloxyalkyl acid phosphates, dialkyl [(meth)acryloyloxyalkyl]phosphites, and (meth)acryloyloxyalkyl acid phosphites; phosphorus-containing vinyl monomers such as 3-chloro-2-acid phosphoxypropyl (meth)acrylate, including alkylene oxide adducts of (meth)acryloyloxyalkyl acid phosphates and acid phosphites, ester compounds of epoxy-containing vinyl monomers such as glycidyl(meth)acrylate and methyl glycidyl(meth)acrylate with phosphoric acid, phosphorous acid, and acid esters thereof;

hydroxyl-containing polymerizable unsaturated monomers such as hydroxyalkyl esters of polymerizable unsaturated carboxylic acids and adducts thereof with ε-caprolactone, such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate, 3-chloro-2-hydroxypropyl(meth)acrylate, di-2-hydroxyethyl fumarate, mono-2-hydroxyethyl monobutyl fumarate, polypropylene glycol mono(meth)acrylate, polyethylene glycol mono(meth)acrylate, and "Placcel FM, FA Monomer" (caprolactone adduct monomer available from Daicel Corporation), including adducts of various unsaturated carboxylic acids such as polymerizable unsaturated carboxylic acids, such as unsaturated mono- and dicarboxylic acids such as (meth)acrylic acid, crotonic acid, maleic acid, fumaric acid, itaconic acid, and citraconic acid, and monoesters of the dicarboxylic acids with monohydric alcohols, and adducts of hydroxyalkyl esters of the polymerizable unsaturated carboxylic acids with anhydrides of polycarboxylic acids such as maleic acid, succinic acid, phthalic acid, hexahydrophthalic acid, tetrahydrophthalic acid, benzenetricarboxylic acid, benzenetetracarboxylic acid, tetrachlorophthalic acid, and dodecenylsuccinic acid, with monoglycidyl esters of monocarboxylic acids such as "Cardura E", coconut oil aliphatic acid glycidyl ester, and octylic acid glycidyl ester and monoepoxy compounds such as butyl glycidyl ether, ethylene oxide, and propylene oxide, as well as adducts thereof with ε-caprolactone and hydroxyvinyl ethers;

dialkylaminoalkyl(meth)acrylates such as dimethylaminoethyl(meth)acrylate and diethylaminoethyl(meth)acrylate; epoxy-containing polymerizable unsaturated monomers such as glycidyl(meth)acrylate, (β-methyl)glycidyl(meth)acrylate, (meth)allyl glycidyl ether, and epoxy-containing polymerizable compounds prepared by addition reaction, in an equimolar ratio, of various unsaturated carboxylic acids such as polymerizable unsaturated carboxylic acids and equimolar adducts of hydroxyl-containing vinyl monomers with the polycarboxylic anhydrides, such as mono-2-(meth)acryloyloxymonoethyl phthalate, with various polyepoxy compounds having at least two epoxy groups per molecule, such as "EPICLON 200", "EPICLON 400", "EPICLON 441", "EPICLON 850", and "EPICLON 1050" (epoxy resins available from DIC Corporation), "jER 828", "jER 1001", and "jER 1004" (epoxy resins available from Mitsubishi Chemical Corporation), and "DENACOL EX-611" (epoxy compound available from Nagase ChemteX Corporation);

isocyanate-containing α,β-ethylenically unsaturated monomers such as monomers having an isocyanate group and a vinyl group, such as 2-hydroxyethyl(meth)acrylate-hexamethylene diisocyanate equimolar adduct and isocyanate ethyl (meth)acrylate; alkoxysilyl-containing polymerizable unsaturated monomers such as silicon-based monomers such as vinylethoxysilane, α-methacryloxypropyltrimethoxysilane, and trimethylsiloxyethyl(meth)acrylate; and carboxylic-containing α,β-ethylenically unsaturated monomers such as α,β-ethylenically unsaturated carboxylic acids such as unsaturated mono- or dicarboxylic acids, such as (meth)acrylic acid, crotonic acid, maleic acid, fumaric acid, itaconic acid, and citraconic acid, and monoesters of the dicarboxylic acids with monohydric alcohols, and adducts of α,β-unsaturated carboxylic acid hydroalkyl esters, such as 2-hydroxyethyl(meth)acrylate, 2-hydroxypropyl(meth)acrylate, 3-hydroxypropyl(meth)acrylate, 2-hydroxybutyl(meth)acrylate, 3-hydroxybutyl(meth)acrylate, 4-hydroxybutyl(meth)acrylate, 3-chloro-2-hydroxypropyl(meth)acrylate, di-2-hydroxyethyl fumarate, mono-2-hydroxyethyl-monobutyl fumarate, and polyethylene glycol mono(meth)acrylate, with anhydrides of polycarboxylic acids such as maleic acid, succinic acid, phthalic acid, hexahydrophthalic acid, tetrahydrophthalic acid, benzenetricarboxylic acid, benzenetetracarboxylic acid, tetrachlorophthalic acid, and dodecenylsuccinic acid.

Particularly preferred are C3 or less alkyl(meth)acrylates such as methyl(meth)acrylate and ethyl(meth)acrylate. To change the surface properties of the pigment surface for enhanced interaction with a pigment dispersant or pigment-dispersing resin, it is preferred to copolymerize at least one polymerizable unsaturated monomer containing a functional group such as a carboxyl, sulfonic acid, phosphoric acid, hydroxyl, or dimethylamino group.

It is preferred to crosslink the polymer so that it does not dissolve from the pigment during the use of the modified pigment. Examples of polyfunctional polymerizable unsaturated monomers for use as a crosslinking component include divinylbenzene, ethylene glycol di(meth)acrylate, diethylene glycol di(meth)acrylate, triethylene glycol di(meth)acrylate, polyethylene glycol di(meth)acrylate, 1,3-butanediol di(meth)acrylate, 1,4-butanediol di(meth)acrylate, 1,6-hexanediol di(meth)acrylate, neopentyl glycol dimethacrylate, trimethylolpropane triethoxy tri(meth)acrylate, trimethylolpropane tri(meth)acrylate, pentaerythritol tri(meth)acrylate, pentaerythritol tetra(meth)acrylate, dipentaerythritol hexa(meth)acrylate, and allyl methacrylate.

Other polymerizable unsaturated monomers may also be used provided that the polymer essentially containing at least one polymerizable unsaturated monomer (C) that is soluble in the nonaqueous solvent and that becomes insoluble or poorly soluble in the nonaqueous solvent after polymerization does not dissolve in the nonaqueous solvent. Examples of other polymerizable unsaturated monomers include polymerizable unsaturated monomers that can be used other than the above alkyl(meth)acrylates having an alkyl group with 4 or more carbon atoms and the above alkyl(meth)acrylates.

For example, monomers having at least one group selected from the group consisting of linear hydrocarbon groups having 6 to 25 carbon atoms, cyclic hydrocarbon groups having 6 to 20 carbon atoms, and dimethylsiloxy, trimethylsiloxy, and perfluoroalkyl groups can also be used. Specific examples of such monomers include linear-hydrocarbon containing monomers such as n-hexyl(meth)acrylate, 2-ethylhexyl(meth)acrylate, lauryl(meth)acrylate, stearyl(meth)acrylate, and isostearyl(meth)acrylate; cyclic-hydrocarbon containing monomers such as cyclohexyl(meth)acrylate, isobornyl(meth)acrylate, dicyclopentenyl(meth)acrylate, and dicyclopentanyl(meth)acrylate; monomers having a trimethylsiloxy group, such as "SILAPLANE TM-0701" (available from JNC Corporation); monomers having a dimethylsiloxy group, such as "SILAPLANE FM-0711" and "SILAPLANE FM-0721" (available from JNC Corporation); and monomers having a perfluoroalkyl group, such as perfluorooctylethyl(meth)acrylate, perfluorohexylethyl(meth)acrylate, and perfluorobutylethyl(meth)acrylate.

The modified pigment used in the present invention is prepared by polymerizing at least one polymerizable unsaturated monomer (C) that is soluble in the nonaqueous solvent and that becomes insoluble or poorly soluble in the nonaqueous solvent after polymerization in the presence of the pigment (A), the nonaqueous solvent, and the polymer (B).

The pigment (A) and the polymer (B) are preferably mixed together before polymerization. The pigment (A) and the polymer (B) can be mixed together, for example, using a homogenizer, disper, bead mill, paint shaker, kneader, roller mill, ball mill, attritor, or sand mill. In the present invention, any form of pigment, such as slurry, wet cake, or powder, may be used. That is, the method of manufacture according to the present invention may use a pigment containing water, such as wet cake.

The mixture of the pigment (A) and the polymer (B) is further mixed with the polymerizable unsaturated monomer (C) and a polymerization initiator, described later, and is polymerized to prepare the modified pigment.

The polymer (B) may be used in any amount; it may be optimized depending on the purpose. Typically, the polymer (B) is used in an amount of 1 to 200 parts, preferably 20 to 150 parts, more preferably 30 to 120 parts, based on 100 parts of the pigment (A).

The polymerizable unsaturated monomer (C) may be used in any amount; it may be optimized depending on the purpose. Typically, the polymerizable unsaturated monomer (C) is used in an amount of 1 to 200 parts, preferably 5 to 50 parts, more preferably 5 to 30 parts, based on 100 parts of the pigment (A).

The polymer (P) with which the pigment is to be finally coated is preferably used in an amount of 2 to 400 parts, more preferably 25 to 200 parts, even more preferably 35 to 180 parts, based on 100 parts of the pigment (A). Accordingly, typically, at least one polymerizable unsaturated monomer (C) is preferably used in an amount of 2 to 300 parts, more preferably 5 to 200 parts, even more preferably 10 to 150 parts, based on 100 parts of the polymer (B).

The polymerizable unsaturated monomer (C) may be polymerized in the presence of the pigment (A), the nonaqueous solvent, and the polymer (B) by commonly known and used polymerization methods, typically in the presence of a polymerization initiator. Examples of such polymerization initiators include radical-generating polymerization catalysts such as azobisisobutyronitrile (AIBN), 2,2-azobis(2-methylbutyronitrile), benzoyl peroxide, t-butyl perbenzoate, t-butyl-2-ethylhexanoate, t-butyl hydroperoxide, di-t-butyl peroxide, and cumene hydroperoxide, which may be used alone or in a combination of two or more.

The polymerization initiator is preferably dissolved into the polymerizable unsaturated monomer (C) before it is added to the mixture of the pigment (A) and the polymer (B) because some polymerization initiators are poorly soluble in the nonaqueous solvent.

The polymerizable unsaturated monomer (C) or the polymerizable unsaturated monomer (C) containing the polymerization initiator may be added dropwise when the polymerization temperature is reached; to achieve better stability, the polymerizable unsaturated monomer (C) is preferably added and sufficiently mixed at room temperature before the mixture is heated to cause polymerization.

The polymerization temperature is typically 60° C. to 130° C. If the pigment (A) is an organic pigment, the mixture is preferably polymerized at 70° C. to 100° C. because an extremely high polymerization temperature might result in significant pigment degradation and morphological changes such as crystal growth.

After polymerization, the materials such as the nonaqueous solvent used for polymerization are removed by filtration, followed by drying and crushing to yield a modified pigment powder. Filtration may be performed, for example, using a Nutsche or filter press. Drying may be performed using a known dryer such as a compartment dryer, vacuum dryer, band dryer, or spray dryer. Crushing may be performed using a known crusher such as a mortar, hammer mill, disk mill, pin mill, or jet mill.

Colorant: Content

The amount of modified pigment added relative to the amount of nonpolar solvent is preferably 1% to 50% by weight, more preferably 2% to 30% by weight.

Because the modified pigment contains the pigment (A) and the polymer (P) formed on the surface thereof by polymerizing the polymer (B) soluble in the nonaqueous solvent and at least one polymerizable unsaturated monomer (C) that is soluble in the nonaqueous solvent and that becomes insoluble or poorly soluble in the nonaqueous solvent after polymerization, the modified pigment can be stably dispersed in the solvent to prepare a colored liquid with a higher coloring agent concentration. Thus, the colored liquid containing the modified pigment has a higher degree of coloration than a colored liquid containing the same amount of unmodified pigment.

It is desirable that a nonpolar colored liquid for electrowetting devices or electrofluidic devices contain a colorant with as low conductivity as possible. If a pigment with high conductivity, such as carbon black, iron black, red ochre, or chrome yellow, is used without any modification, the resulting colored liquid shows excessively high electrical conductivity. Because the pigment (A) contained in the modified pigment used herein is at least partially coated with the polymer (P), the resulting colored liquid shows reduced electrical conductivity. In particular, if the pigment (A) is a pigment such as carbon black or iron black, the modified pigment is useful for electrowetting devices and electrofluidic devices, which modulate the brightness of light passing therethrough.

Other Additives

The colored liquid according to the present invention may contain additives such as surfactants, dispersants, humectants, thickeners, preservatives, viscosity stabilizers, grinding aids, fillers, antisettling agents, photoprotective agents, antioxidants, biocides, degassing/defoaming agents, foaming inhibitors, and antibaking agents provided that they do not interfere with the advantageous effects of the present invention. It is desirable that these additives be added in such amounts that they do not increase the conductivity. Examples of surfactants that can be used include polyalkylene glycols and derivatives thereof. Examples of dispersants include polyamides, polyesters, polyacrylates, polyvinyloxazolidones, polystyrenes, polyepoxides, polyurethanes, polyvinylhalogens. Examples of commercially available dispersants include, but not limited to, Solsperse from Lubrizol, Tegosperse from Evonik, EFKA from BASF, and DISPER-BYK from BYK-Chemie GmbH.

Method for Manufacturing Colored Liquid

The colored liquid according to the present invention can be prepared by known methods for manufacturing pigment dispersions. For example, the colored liquid can be prepared by processing a mixture of the resin-coated coloring agent, the nonpolar solvent, and optional additives using a common disperser such as a bead mill to disperse the resin-coated coloring agent. Alternatively, the colored liquid can be prepared by preparing a concentrated dispersion (mill base) using a common disperser such as a bead mill in advance and then diluting the dispersion to the desired viscosity by adding the nonpolar solvent with stirring. The additives may be added at any suitable timing, such as before or after dispersion, depending on the types thereof.

Examples of stirring and dispersing apparatuses for dispersing the pigment other than bead mills include various commonly known and used dispersers such as ultrasonic homogenizers, high-pressure homogenizers, paint shakers, ball mills, roller mills, sand mills, sand grinders, Dyno-Mill, Dispermat, SC-Mill, and Nanomizer.

The colored liquid thus prepared preferably has a relative dielectric constant of less than 25. The colored liquid also preferably has a lower viscosity because it results in a higher response speed in the switching of optical modulation. Accordingly, the colored liquid preferably has a viscosity of less than 300 mPa·s, more preferably 100 mPa·s, at 25° C.

Polar Solvent

A multi-phase liquid colored composition according to the present invention contains the colored liquid and a polar solvent immiscible with the colored liquid.

Examples of immiscible polar solvents include water, glycols, alcohols, polyols, ethers, esters, ketones, acetals, ketals, lactones, carbonates, lactams, urethanes (carbamates), ureas, pyrrolidines, pyrrolidones, sulfones, sulfoxides, and amides, specifically, for example, water, methanol, ethanol, isopropanol, n-propanol, 1,2-propylene glycol, 1,3-propylene glycol, ethylene glycol, triethylene glycol, tetraethylene glycol, glycerol, 1,4-butylene glycol, diethylene glycol, dipropylene glycol, ethylene carbonate, propylene carbonate, 1,2-butylene carbonate, 1,2-cyclohexane carbonate, glycerol carbonate, dimethyl carbonate, diethyl carbonate, acetone, acetophenone, pyridine, dimethylmalonic acid, diacetone alcohol, hydroxypropyl carbamate, β-hydroxyethyl carbamate, formamide, N-methylformamide, dimethylformamide, N-methylacetoamide, dimethylacetoamide, dimethyl sulfoxide, sulfolane, 2-pyrrolidone, N-methyl-2-pyrrolidone, N-cyclohexyl-2-pyrrolidone, acetoacetone, cyclohexanone, ethyl acetoacetate, ethyl-L-lactate, pyrrole, N-methylpyrrole, N-ethylpyrrole, 4H-pyran-4-one, 1,3-dimethyl-2-imidazolidinone, morpholine, N-ethylmorpholine, N-formylmorpholine, β-propiolactone, β-valerolactone, β-hexalactone, γ-butyrolactone, γ-valerolactone, γ-hexalactone, γ-heptalactone, γ-octalactone, γ-nonalactone, γ-decalactone, δ-valerolactone, δ-hexalactone, δ-heptalactone, δ-octalactone, δ-nonalactone, δ-decalactone, and any combination thereof.

These polar solvents preferably have a higher relative dielectric constant than the colored liquid. To impart a higher relative dielectric constant, an electrolyte such as a salt that dissociates into ions in the polar solvent may be added. The ions may be either cations or anions. Specific examples of such salts include salts containing cations such as pyrazoline, 2-imidazoline, pyrazole, imidazoline-2-thione, 1,2,3-thiazole, 1,2,4-thiazole, IH-tetrazole, oxazoline, 5-oxazolone, isooxazole, oxazole, 2-thiazoline, isothiazole, thiazole, 1,2, 3-oxadiazo i.e., 1,2,4-oxadiazo i.e., 1,2,5-oxadiazo i.e., 1,3, 4-oxadiazole, 1,3,4-thiadiazole, LH-pyridin-2-one, piperazine, pyridizine, 1,2,3-triazine, 1,2,4-triazine, oxazine, thiomorpholine, oxadiazine, oxathiazine, indoline, indole, carbazole, indazole, benzimidazole, quinoxaline, phthalazine, 1,5-naphthyridine, phenazine, benzothiazole, 2H-I 1,4-benzoxazine, phenoxazine, and phenothiazine.

The polar solvent may be added in any suitable amount depending on the desired relative dielectric constant. For example, the polar solvent may be used in an amount of 10% by weight or less.

Colorant

The polar solvent may optionally be colored. Any colorant that is used as a coloring material may be used. For example, the organic pigments, inorganic pigments, and dyes described above for use as the coated coloring agent can be used.

If the multi-phase liquid colored composition is used with devices, it is preferred to select a coloring agent having a color different from the color used for the nonpolar solvent. In particular, a coloring agent with high color purity and density and high transparency is preferred. Alternatively, it is possible to use an electrowetting device having pixels containing, as the colored liquid, a black (K) liquid containing a modified pigment prepared from a black pigment as well as cyan (C), magenta (M), and yellow (Y) liquids and other optional colored liquids, such as green and white liquids, to provide a full-color image display.

The polar solvent may contain additives such as surfactants, dispersants, humectants, thickeners, preservatives, viscosity stabilizers, grinding aids, fillers, antisettling agents, photoprotective agents, antioxidants, biocides, degassing/defoaming agents, foaming inhibitors, and antibaking agents provided that they do not interfere with the advantageous effects of the present invention. Examples of surfactants that can be used include, but not limited to, anionic surfactants such as alkylsulfonate salts, alkylbenzenesulfonate salts, and alkylcarboxylate salts; cationic surfactants such as alkylammonium salts and alkylpyridinium salts; and nonionic surfactants such as polyalkylene glycols and derivatives thereof.

Electrowetting Device

The colored liquid according to the present invention is suitable for use with electrowetting devices, which move the colored liquid by means of an external electric field. The colored liquid has, for example, superior light resistance because it contains a pigment as a coloring agent. In particular, the colored liquid is preferred for use with image display devices because the dispersion stability provided by the present invention maximizes the long-term operating stability of the devices.

An example of an electrowetting device with which the nonconductive colored liquid can be used is illustrated below. Specifically, a display space is provided between layers having electrodes and is filled with a multi-phase liquid colored composition containing the colored liquid and a polar solvent immiscible with the colored liquid.

The layer on the display side of the display space is, for example, a transparent layer through which the colored liquid is visible, and the layer on the non-display side is a light-scattering layer. As a voltage is applied to the colored liquid, an electrowetting effect moves the colored liquid into the display space or increases the surface area thereof on the display side, thus displaying a color.

The light-scattering layer on the non-display side may be omitted if the colored liquid is a light-scattering fluid prepared by adding light-scattering molecules to the polar solvent.

Specifically, the electrowetting device includes an upper layer on the display side, an intermediate layer made of a light-scattering material and having a through-hole, and a lower layer. An upper space on the display side is formed between the upper layer and the intermediate layer, and a lower space is formed between the intermediate layer and the lower layer. The lower space, the through-hole, and the upper space are sealed to form a communication channel used as a liquid reservoir. The liquid reservoir is filled with a multiphase liquid colored composition containing the colored liquid and a polar solvent immiscible with the colored liquid. The electrowetting device, having the channel for the colored liquid in which the upper and lower spaces communicate through the through-hole, causes the colored liquid to flow into and out of the upper space on the display side by means of electrowetting by applying and not applying a voltage to the colored liquid.

When the colored liquid flows into the upper space, it allows no light to pass and displays a colored image. When the colored liquid flows out of the upper space, it allows light to pass and displays white as a result of light scattering by the light-scattering material. Thus, the brightness of the light passing through the upper space is modulated for display.

This device has a two-terminal structure including an electrode disposed on the upper layer and an electrode disposed on the inner surface of the through-hole. These two terminals are connected together via a switch. The switch can be turned on and off to cause the colored fluid to flow into the upper space on the display side so that a colored image is displayed and to flow out of the upper space so that the screen is switched to a white scattered image. Instead of the two-terminal structure, the device may have a three-terminal structure.

A display device having a three-terminal structure includes an upper electrode disposed on the top and/or bottom surface of the upper space, a lower electrode disposed on the top and/or bottom surface of the lower space, and a common electrode disposed on the inner surface of the through-hole in the white scattering sheet. Upper and lower power supply circuits are connected to the common electrode and the upper electrode and to the common electrode and the lower electrode, respectively, with circuit-switching means disposed therebetween. In this display device, the circuit-switching means in the upper power supply circuit and the circuit-switching means in the lower power supply circuit can be alternately switched on and off to cause the colored liquid to flow into and out of the upper space.

Because the upper and lower power supply circuits are alternately switched on and off to cause the colored liquid to flow into and out of the upper space, the three-terminal structure allows the colored liquid to flow into and out of the upper space at high speed.

A dielectric layer may be disposed on the side of each electrode adjacent to the colored liquid irrespective of the device structure. The dielectric layer preferably contains, for example, Parylene or aluminum oxide and has a thickness of about 1 to 0.1 μm.

A water-repellent film that functions as a hydrophilic layer when a voltage is applied thereto may be formed on the surface of the dielectric layer such that the water-repellent film contacts the colored liquid, which is preferred for video display because the colored liquid can be moved at high speed or the surface area thereof can be increased and decreased at high speed.

The device has its display space divided into pixels by partitions, and the colored liquid used for each pixel is one of R, G, and B colored liquids or one of C, M, Y, and K colored liquids. These colored liquids are introduced into and spread over the display space to provide a full-color image display and are moved at high speed to provide a full-color video display.

The device may include R, G, and B color filters or C, M, Y, and K color filters through which light passes before or after passing through the display space to further modulate the light.

EXAMPLES

The present invention is further illustrated by the following examples, although these examples do not limit the present invention. In the examples below, g and % are by mass.

Resin Synthesis Method 1—Synthesis of Polymer (B-1) Soluble in Nonaqueous Solvent A four-necked flask equipped with a thermometer, a stirrer, a reflux condenser, and a nitrogen gas inlet tube was charged with 950 g of butyl acetate, and it was heated to 80° C. When that temperature was reached, a mixture of 936 g of butyl acrylate, 50 g of dimethylaminoethyl methacrylate, and 7 g of 2,2'-azobis(2-methylbutyronitrile) ("V-59" from Wako Pure Chemical Industries, Ltd.) was added dropwise over 4 hours. After the dropwise addition was complete, the mixture was heated to 90° C. and was maintained at that temperature for 10 hours to continue the reaction.

The temperature of the reaction solution was lowered to 50° C. A solution of 0.2 g of t-butylpyrocatechol in 20 parts of butyl acetate was added, and 15 g of glycidyl methacrylate was further added. The reaction solution was heated to 80° C. and was reacted at that temperature for 10 hours to yield a solution of polymer (B-1) soluble in a nonaqueous solvent.

Resin Synthesis Methods 2 to 5—Synthesis of Polymers (B-2) to (B-5) Soluble in Nonaqueous Solvent Polymers (B-2) to (B-5) were prepared as in resin synthesis method 1 except that the types and amounts of raw materials for polymer (B-1) in resin synthesis method 1 were changed as listed in Table 1.

Reference Example 1

Modified Pigment Synthesis Method 1

In a polyethylene jar were placed 100 g of Printex 45 (carbon black available from Evonik Degussa Gmbh), 13 g of polymer (B-1), 600 g of 1.25 mm zirconia beads, and 300 g of heptane, and they were mixed with a paint shaker (available from Toyo Seiki Seisaku-sho, Ltd.) for 90 minutes. After the mixture was diluted with 200 g of heptane, the zirconia beads were removed to yield a pigment mixture. A separable flask equipped with a thermometer, a stirrer, a reflux condenser, and a nitrogen gas inlet tube was charged with 400 g of the resulting pigment mixture. To the mixture were added a solution of 1.6 g of V-59 in a polymerizable monomer composition containing 2.8 g of methyl methacrylate and 5.2 g of ethylene glycol dimethacrylate and 250 g of heptane. After stirring was continued at room temperature for 30 minutes, the mixture was heated to 80° C., and the reaction was continued at that temperature for 15 hours.

After cooling, the mixture was filtered to separate the polymer-treated pigment from the polymerization solvent. The resulting polymer pigment was dried at 100° C. with a hot air dryer for 5 hours and was crushed with a crusher to yield modified pigment (1).

Reference Example 2

Modified Pigment Synthesis Method 2

In a polyethylene jar were placed 15 g of #2300 (carbon black available from Mitsubishi Chemical Corporation), 6.2 g of the polymer (B-2) solution, 100 g of 1.25 mm zirconia beads, and 69 g of decalin, and they were mixed with a paint shaker (available from Toyo Seiki Seisaku-sho, Ltd.) for 90 minutes. After the mixture was diluted with 38 g of decalin, the zirconia beads were removed to yield a pigment mixture.

A separable flask equipped with a thermometer, a stirrer, a reflux condenser, and a nitrogen gas inlet tube was charged with 111 g of the resulting pigment mixture. To the mixture was added a solution of 0.5 g of V-59 in a polymerizable monomer composition containing 0.9 g of methyl methacrylate and 1.7 g of ethylene glycol dimethacrylate. After stirring was continued at room temperature for 30 minutes, the mixture was heated to 80° C., and the reaction was continued at that temperature for 15 hours to yield a dispersion of modified pigment (2) in decalin with a solids content (hereinafter referred to as N.V.) of about 16% by mass.

Modified pigment (2) was optionally cleaned by a process such as filtration or centrifugation.

Reference Examples 3 to 10

Methods for Synthesizing Modified Pigments (3) to (10)

Dispersions of modified pigments (3) to (10) in decalin were prepared as in Reference Example 2 (synthesis method 2 in the tables) except that the types and amounts of raw materials used for modification were changed as listed in Tables 1 and 2. The resulting modified pigments were optionally cleaned by a process such as filtration or centrifugation.

TABLE 1

| | | | Ref. 1 | Ref. 2 | Ref. 3 | Ref. 4 | Ref. 5 |
|---|---|---|---|---|---|---|---|
| Modified pigment name | | | (1) | (2) | (3) | (4) | (5) |
| Synthesis method | | | Synthesis method 1 | Synthesis method 2 | Synthesis method 2 | Synthesis method 2 | Synthesis method 2 |
| Polymer | Polymer name | | B-1 | B-2 | B-3 | B-4 | B-5 |
| | Solvent name | Butyl acetate | 950 | 70 | 70 | 40.8 | 70 |
| | Monomer name | Butyl acrylate | 936 | | | | |
| | | Isodecyl methacrylate | | 66.5 | | | |
| | | Lauryl acrylate | | | 66.5 | | |
| | | S-lauryl methacrylate | | | | | 66.5 |
| | | Stearyl methacrylate | | | | 57 | |
| | | DMAEMA | 50 | 3.5 | 3.5 | 3 | 3.5 |
| | Diluent name | Butyl acetate | | | | 19.2 | |
| | Polymerization initiator name | V-59 | 7 | 0.5 | 0.5 | 0.4 | 0.5 |
| | Polymerization inhibitor name | t-Butylpyrocatechol | 0.2 | 0.01 | 0.01 | 0.01 | 0.01 |
| | Solvent name | Butyl acetate | 20 | 1.1 | 1.1 | 0.9 | 1.1 |
| | Monomer name | Glycidyl methacrylate | 15 | 1.1 | 1.1 | 0.9 | 1.1 |
| Name of nonaqueous solvent for dispersion | | Heptane | 300 | | | | |
| | | Decalin | | 69.0 | 73.0 | 73.0 | 73.0 |
| Pigment name | | Printex 45 | 100 | | | | |
| | | #2300 | | 15.0 | 15.0 | 15.0 | 15.0 |
| Polymer | | | 13 | 6.2 | 9.3 | 10.3 | 9.5 |
| Name of solvent for removal | | Heptane | 200 | | | | |
| | | Decalin | | 38.0 | 65.0 | 32.5 | 32.5 |
| Pigment mixture | | | 400 | 111 | 158 | 126 | 124 |
| Polymerizable monomer name | | Methyl methacrylate | 2.8 | 0.9 | 1.0 | 1.0 | 1.0 |
| | | EGDMA | 5.2 | 1.7 | 1.9 | 1.9 | 1.9 |
| Additional solvent name | | Heptane | 250 | | | | |
| Polymerization initiator name | | V-59 | 1.6 | 0.5 | 0.6 | 0.6 | 0.6 |

In the table, Ref. denotes the reference examples, Printex 45 is a carbon black available from Evonik Degussa Gmbh, #2300 is a carbon black available from Mitsubishi Chemical Corporation, DMAEMA denotes dimethylaminoethyl methacrylate, and EGDMA denotes ethylene glycol dimethacrylate.

TABLE 2

| | | | Ref. 6 | Ref. 7 | Ref. 8 | Ref. 9 | Ref. 10 |
|---|---|---|---|---|---|---|---|
| Modified pigment name | | | (6) | (7) | (8) | (9) | (10) |
| Synthesis method | | | Synthesis method 2 | Synthesis method 2 | Synthesis method 2 | Synthesis method 2 | Synthesis method 2 |
| Polymer | Polymer name | | B-3 | B-3 | B-3 | B-3 | B-4 |
| | Solvent name | Butyl acetate | 70 | 70 | 70 | 70 | 40.8 |
| | Monomer name | Lauryl acrylate | 66.5 | 66.5 | 66.5 | 66.5 | |
| | | Stearyl methacrylate | | | | | 57 |
| | | DMAEMA | 3.5 | 3.5 | 3.5 | 3.5 | 3 |
| | Diluent name | Butyl acetate | | | | | 19.2 |
| | Initiator name | V-59 | 0.5 | 0.5 | 0.5 | 0.5 | 0.4 |
| | Polymerization inhibitor name | t-Butylpyrocatechol | 0.01 | 0.01 | 0.01 | 0.01 | 0.01 |
| | Solvent name | Butyl acetate | 1.1 | 1.1 | 1.1 | 1.1 | 0.9 |
| | Monomer name | Glycidyl methacrylate | 1.1 | 1.1 | 1.1 | 1.1 | 0.9 |

TABLE 2-continued

|  |  | Ref. 6 | Ref. 7 | Ref. 8 | Ref. 9 | Ref. 10 |
|---|---|---|---|---|---|---|
| Name of nonaqueous solvent for dispersion | Decalin | 73.2 | 73.0 | 73.2 | 73.2 | 120.5 |
| Pigment name | #2300 | 15.0 |  |  |  |  |
|  | #960 |  | 15.0 |  |  |  |
|  | MA8 |  |  | 15.0 |  | 25.0 |
|  | MA100R |  |  |  | 15.0 |  |
| Polymer |  | 9.3 | 9.3 | 9.3 | 9.3 | 17.1 |
| Name of nonaqueous solvent for removal | Decalin | 65.0 | 32.5 | 65.0 | 65.0 | 108.5 |
| Pigment mixture |  | 145 | 124 | 159 | 142 | 229 |
| Polymerizable monomer name | Methyl methacrylate | 0.9 | 1.0 | 1.0 | 0.9 | 1.5 |
|  | EGDMA | 1.8 | 1.9 | 1.9 | 1.7 | 2.7 |
| Polymerization initiator name | V-59 | 0.5 | 0.6 | 0.6 | 0.5 | 0.8 |

In the table, Ref. denotes the reference examples, #2300, #960, MA8, and MA100R are carbon blacks available from Mitsubishi Chemical Corporation, DMAEMA denotes dimethylaminoethyl methacrylate, and EGDMA denotes ethylene glycol dimethacrylate.

Examples 1 to 10

Evaluation of Colored Liquid and Multi-Phase Liquid Colored Composition

The dispersions of modified pigment (1) and modified pigments (2) to (10) in decalin were used to prepare colored liquids (1) to (10) and multi-phase liquid colored compositions (2) to (10).

Colored liquid (1) was prepared by charging 5 g of modified pigment (1) and 95 g of decalin and performing ultrasonic dispersion with an ultrasonic disperser for 2 hours. Colored liquids (2) to (10) were prepared by adding 56 g of decalin to 44 g of one of the dispersions of modified pigments (2) to (10) in decalin.

Multi-phase liquid colored compositions (2) to (10) were prepared by charging a 10 mL vial with 5 g of ethylene glycol and 0.5 g of one of colored liquids (2) to (10).

The electrical conductivity and dispersed particle size of the resulting colored liquids were measured by the following measurement procedures. The separability of the multi-phase liquid colored compositions was also measured by the following measurement procedure.

Colored Liquid—Electrical Conductivity Measurement

The electrical conductivity of colored liquids (1) to (10) was measured at room temperature with a "Model 627" conductivity meter available from Scientifica. The results are listed in Tables 3 and 4.

Colored Liquid—Dispersed Particle Size Measurement

The dispersed particle size of colored liquids (1) to (9) was measured at room temperature with an "FPAR-1000" laser particle size analyzer system available from Otsuka Electronics Co., Ltd.

The dispersed particle size of colored liquid (10) was measured at room temperature with a "Microtrack UPA-150" particle size measurement system available from Nikkiso Co., Ltd. The results are listed in Tables 3 and 4.

Multi-Phase Liquid Colored Composition—Separability Evaluation

Multi-phase liquid colored compositions (2) to (10) were stirred 30 times by hand. After 72 hours, the separability between ethylene glycol and colored liquids (2) to (10) was visually inspected.

The separation condition was rated on a 5-grade scale using the following criteria. The results are listed in Tables 3 and 4.

5: The ethylene glycol was not colored, and the composition was separated into two layers by a clear interface.

4: The ethylene glycol was not colored, and the composition had a slightly unclear interface.

3: The ethylene glycol was colored, and the composition had a slightly unclear interface.

2: The ethylene glycol was colored, and the composition had an unclear interface.

1: The composition was not separated into two layers.

TABLE 3

|  | Example 1 Modified pigment (1) | Example 2 Modified pigment (2) | Example 3 Modified pigment (3) | Example 4 Modified pigment (4) | Example 5 Modified pigment (5) |
|---|---|---|---|---|---|
| Colored liquid sample name | (1) | (2) | (3) | (4) | (5) |
| Dispersed particle size (nm) | — | 1,561 | 1,987 | 1,145 | 1,242 |
| Electrical conductivity (pS/cm) | 0.25 | 7 | 36 | 57 | 69 |
| Multi-phase liquid colored composition sample | — | (2) | (3) | (4) | (5) |
| Separability | — | 5 | 5 | 5 | 5 |

TABLE 4

|  | Example 6 Modified pigment (6) | Example 7 Modified pigment (7) | Example 8 Modified pigment (8) | Example 9 Modified pigment (9) | Example 10 Modified pigment (10) |
|---|---|---|---|---|---|
| Colored liquid sample name | (6) | (7) | (8) | (9) | (10) |
| Dispersed particle size (nm) | 1,396 | 1,377 | 455 | 535 | 188 |
| Electrical conductivity (pS/cm) | 18 | 16 | 141 | 118 | 120 |
| Multi-phase liquid colored composition sample | (6) | (7) | (8) | (9) | (10) |
| Separability | 4 | 4 | 4 | 4 | 4 |

The results demonstrate that Examples 2 to 5, which used modified pigments (2) to (5) of Reference Examples 2 to 5, which used #2300 as the pigment and different monomers for the polymer, had considerably reduced electrical conductivity. The separability of the multi-phase liquid colored compositions was also good.

In addition, the results demonstrate that Examples 6 to 10, which used different pigments, had considerably reduced electrical conductivity. The separability of the multi-phase liquid colored compositions was also good.

Comparative Example 1

Colored liquid (H1) was prepared as in Example 1 except that modified pigment (1) was replaced with Printex 45, specifically, by charging 5 g of Printex 45 and 95 g of decalin and performing ultrasonic dispersion with an ultrasonic disperser for 2 hours. The electrical conductivity of colored liquid (H1) was measured to be 563 pS/cm.

This result demonstrates that Example 1, which used a modified carbon black pigment, had reduced electrical conductivity.

A separability test for ethylene glycol could not be carried out because Printex 45 settled in the decalin solution while it was left standing.

Comparative Example 2

Colored liquid (H2) was prepared as in Example 1 except that modified pigment (1) was replaced with #2300, specifically, by charging 5 g of #2300 and 95 g of decalin and performing ultrasonic dispersion with an ultrasonic disperser for 2 hours. The electrical conductivity of colored liquid (H2) was measured to be more than 20,000 pS/cm and could not be accurately measured.

This result demonstrates that the examples that used a modified carbon black pigment had reduced electrical conductivity.

A separability test for ethylene glycol could not be carried out because #2300 settled in the decalin solution while it was left standing.

Example 11

Colored liquid (11) was prepared as in Example 1 except that decalin was replaced with xylene, specifically, by charging 5 g of modified pigment (1) and 95 g of xylene and performing ultrasonic dispersion with an ultrasonic disperser for 2 hours. The average particle size of the modified pigment in colored liquid (11) was measured to be 327 nm with an FPAR-1000 (available from Otsuka Electronics Co., Ltd.). Multi-phase liquid colored composition (11) was prepared by charging a 10 mL vial with 5 g of ethylene glycol and 0.5 g of colored liquid (11). A separability evaluation revealed that the ethylene glycol was not colored and the separability was good.

Comparative Example 3

Colored liquid (H3) was prepared as in Example 11 except that modified pigment (1) was replaced with Printex 45, specifically, by charging 5 g of Printex 45 and 95 g of xylene and performing ultrasonic dispersion with an ultrasonic disperser for 2 hours. The average particle size of the pigment in colored liquid (H3), i.e., Printex 45, could not be measured because it was unstable and settled immediately after dispersion.

A separability test for ethylene glycol could not be carried out because Printex 45 settled in the xylene solution while it was left standing.

The results of Example 11 and Comparative Example 3 demonstrate that modified pigment (1) had superior dispersion stability in the nonpolar solvent and that colored liquid (11), which used modified pigment (1), had good separability from ethylene glycol.

Reference Example 11

Method for Synthesizing Modified Pigment (11)

A dispersion of modified pigment (11) in dodecane was prepared as in Reference Example 2 (synthesis method 2 in the tables) except that the types and amounts of raw materials used for modification were changed as listed in Table 5. The resulting modified pigment was cleaned by a process such as filtration or centrifugation.

Reference Example 12

Method for Synthesizing Modified Pigment (12)

Modified pigment (12) was prepared as in Reference Example 1 (synthesis method 1 in the tables) except that the types and amounts of raw materials used for modification were changed as listed in Table 5.

TABLE 5

|  | Ref. 11 | Ref. 12 |
|---|---|---|
| Modified pigment name | (11) | (12) |
| Synthesis method | Synthesis method 2 | Synthesis method 1 |

TABLE 5-continued

|  |  | Ref. 11 | Ref. 12 |
|---|---|---|---|
| Polymer | Polymer name | B-4 | B-3 |
|  | Solvent name | Butyl acetate | |
|  |  | 40.8 | 70.0 |
|  | Monomer name | Stearyl methacrylate | |
|  |  | 57.0 | |
|  | Lauryl acrylate | 66.5 | |
|  | DMAEMA | 3.0 | 3.5 |
|  | Diluent name | Butyl acetate | |
|  |  | 19.2 | |
|  | Initiator name | V-59 | |
|  |  | 0.4 | 0.5 |
|  | Polymerization inhibitor name | t-Butylpyrocatechol | |
|  |  | 0.01 | 0.01 |
|  | Solvent name | Butyl acetate | |
|  |  | 0.9 | 1.1 |
|  | Monomer name | Glycidyl methacrylate | |
|  |  | 0.9 | 1.1 |
| Name of nonaqueous solvent for dispersion | | Dodecane | |
|  |  | 76.0 | 73.0 |
| Pigment name | | MA8 | |
|  |  | 15.0 | |
|  |  | #2300 | |
|  |  |  | 15.0 |
| Polymer | | 18.0 | 9.3 |
| Name of nonaqueous solvent for removal | | Dodecane | |
|  |  | 100 | 65.0 |
| Pigment mixture | | 178 | 158 |
| Polymerizable monomer name | | Methyl methacrylate | |
|  |  | 1.0 | 1.0 |
|  |  | EGDMA | |
|  |  | 1.9 | 1.9 |
| Polymerization initiator name | | V-59 | |
|  |  | 0.6 | 0.6 |

Example 12

Evaluation of Colored Liquid and Multi-Phase Liquid Colored Composition

The dispersion of modified pigment (11) in dodecane was used to prepare colored liquid (12) and multi-phase liquid colored composition (12).

Colored liquid (12) was prepared by adding 31.5 g of dodecane to 68.5 g of the dispersion of modified pigment (11) in dodecane.

Example 13

Evaluation of Colored Liquid and Multi-Phase Liquid Colored Composition

Modified pigment (12) was used to prepare colored liquid (13) and multi-phase liquid colored composition (13).

Colored liquid (13) was prepared by charging 1.5 g of modified pigment (12) and 18.5 g of xylene and performing ultrasonic dispersion with an ultrasonic disperser for 2 hours.

Multi-phase liquid colored compositions (12) and (13) were prepared by charging a 10 mL vial with 5 g of ethylene glycol and 0.5 g of colored liquid (12) or (13).

Comparative Example 4

Colored liquid (H4) was prepared by charging 1 g of MA8 and 19 g of decalin and performing ultrasonic dispersion with an ultrasonic disperser for 2 hours. Multi-phase liquid colored composition (H4) was prepared by charging a 10 mL vial with 5 g of ethylene glycol and 0.5 g of colored liquid (H4).

The electrical conductivity of colored liquids (12), (13), and (H4) was measured at room temperature with a device available from Dispersion Technology, Inc. The dispersed particle size was measured at room temperature with a "Microtrack UPA-150" particle size measurement system available from Nikkiso Co., Ltd. The separability of multi-phase liquid colored compositions (12), (13), and (H4) was measured by the evaluation procedure described above. The measurement results and the evaluation results are listed in Table 6 along with the results of Example 11 and Comparative Examples 1 to 3.

Multi-Phase Liquid Colored Composition—Separability Evaluation

Multi-phase liquid colored compositions (12), (13), and (H4) were evaluated by the separability evaluation procedure described above. The results are listed in Table 6 along with the results of Example 11 and Comparative Examples 1 to 3.

TABLE 6

|  | Example 11 Modified pigment (1) | Example 12 Modified pigment (11) | Example 13 Modified pigment (12) | Comparative example 1 Printex 45 | Comparative example 2 #2300 | Comparative example 3 Printex 45 | Comparative example 4 MA8 |
|---|---|---|---|---|---|---|---|
| Colored liquid sample name | (11) | (12) | (13) | (H1) | (H2) | (H3) | (H4) |
| Dispersed particle size (nm) | 327 | 178 | 236 | 3,660 | 1,719 | Not available | 833 |
| Electrical conductivity (pS/cm) | — | 224 | 112 | 563 | >20,000 | Not available | >20,000 |
| Multi-phase liquid colored composition sample name | (11) | (12) | (13) | — | — | — | (H4) |
| Separability | 5 | 4 | 3 | Not available | Not available | Not available | 1 |

These results demonstrate that Examples 12 and 13, which used modified pigments (11) and (12), respectively, had small dispersed particle sizes and considerably reduced electrical conductivity.

Reference Examples 13 to 15

Methods for Synthesizing Modified Pigments (13) to (15)

Dispersions of modified pigments (13) to (15) in tetradecane were prepared as in Reference Example 2 (synthesis method 2 in the tables) except that the types and amounts of raw materials used for modification were changed as listed in Table 7. Fastogen Blue TGR is a phthalocyanine pigment available from DIC Corporation, Cinquasia Magenta L4400 is a quinacridone pigment available from BASF, and Fast Yellow 7413 is an azo pigment available Sanyo Color Works, Ltd.

TABLE 7

|  |  | Ref. 13 | Ref. 14 | Ref. 15 |
|---|---|---|---|---|
| Modified pigment name |  | (13) | (14) | (15) |
| Synthesis method |  | Synthesis method 2 | Synthesis method 2 | Synthesis method 2 |
| Polymer name |  | B-3 | B-3 | B-3 |
| Name of nonaqueous solvent for dispersion | Tetradecane | 67 | 67 | 67 |
| Pigment name | Fastogen Blue TGR | 15 |  |  |
|  | Cinquasia Magenta L4400 |  | 15 |  |
|  | Fast Yellow 7413 |  |  | 15 |
| Polymer |  | 18 | 18 | 18 |
| Name of solvent for removal | Tetradecane | 100 | 100 | 100 |
| Pigment mixture |  | 178 | 178 | 178 |
| Polymerizable monomer name | Methyl methacrylate | 1 | 1 | 1 |
|  | EGDMA | 1.9 | 1.9 | 1.9 |
| Polymerization initiator name | V-59 | 0.6 | 0.6 | 0.6 |

Examples 14 to 16

Evaluation of Colored Liquid and Multi-Phase Liquid Colored Composition

The solutions of modified pigments (13) to (15) in tetradecane were centrifuged to separate the modified pigments from the tetradecane solutions. Colored liquids (14) to (16) were prepared by charging 1.5 g of one of the modified pigments and 8.5 g of toluene and performing ultrasonic dispersion with an ultrasonic disperser for 2 hours.

Multi-phase liquid colored compositions (14) to (16) were prepared by charging a 10 mL vial with 5 g of water and 0.5 g of one of colored liquids (14) to (16).

Comparative Example 5

Evaluation of Colored Liquid and Multi-Phase Liquid Colored Composition

Colored liquid (H5) was prepared by charging a 10 mL vial with 0.5 g of Fastogen Blue TGR, 0.3 g of Solsperse 17000 (available from Lubrizol Corporation), and 9.2 g of toluene and performing ultrasonic dispersion with an ultrasonic disperser for 2 hours.

Comparative Examples 6 and 7

Evaluation of Colored Liquid and Multi-Phase Liquid Colored Composition

Colored liquids (H6) and (H7) were prepared as in Comparative Example 5 except that the pigment used was changed as listed in Table 8.

Multi-phase liquid colored compositions (H5) to (H7) were prepared by charging a 10 mL vial with 5 g of water and 0.5 g of one of colored liquids (H5) to (H7).

Multi-Phase Liquid Colored Composition—Separability

Multi-phase liquid colored compositions (14) to (16) and (H5) to (H7) were stirred 10 times by hand. After 30 minutes, the separability between water and colored liquids (14) to (16) and (H5) to (H7) was visually inspected.

The separation condition was rated on a 5-grade scale using the following criteria. The results are listed in Table 8.

5: The water was not colored, and the composition was separated into two layers by a clear interface.

4: The water was not colored, and the composition had a slightly unclear interface.

3: The water was colored, and the composition had a slightly unclear interface.

2: The water was colored, and the composition had an unclear interface.

1: The composition was not separated into two layers.

TABLE 8

|  | Example 14 Modified pigment (13) | Example 15 Modified pigment (14) | Example 16 Modified pigment (15) | Comparative example 5 TGR | Comparative example 6 L4400 | Comparative example 7 7413 |
|---|---|---|---|---|---|---|
| Colored liquid sample name | (14) | (15) | (16) | (H5) | (H6) | (H7) |
| Multi-phase liquid colored composition sample name | (14) | (15) | (16) | (H5) | (H6) | (H7) |
| Separability | 4 | 4 | 4 | 2 | 2 | 2 |

These results demonstrate that Examples 14 to 16, which used a modified pigment, had superior separability.

The invention claimed is:

1. A colored liquid for a device having an optical modulation system that moves or deforms a liquid by an external electric field to modulate color or brightness,
the colored liquid containing a nonpolar solvent and a colorant, the colorant being a modified pigment comprising a pigment (A) and a polymer (P) formed on a surface thereof by polymerizing a polymer (B) soluble in a nonaqueous solvent and at least one polymerizable unsaturated monomer (C) that is soluble in the nonaqueous solvent and that becomes insoluble or poorly soluble in the nonaqueous solvent after polymerization.

2. The colored liquid according to claim 1, wherein the colorant is a modified pigment prepared by mixing together the pigment (A), the nonaqueous solvent, and the polymer (B) soluble in the nonaqueous solvent and further mixing and polymerizing the at least one polymerizable unsaturated monomer (C).

3. The colored liquid according to claim 1, wherein the polymer (B) soluble in the nonaqueous solvent is an acrylic resin (BF) having a polymerizable unsaturated group.

4. The colored liquid according to claim 3, wherein the acrylic resin (BF) having a polymerizable unsaturated group is a copolymer of polymerizable unsaturated monomers comprising a major proportion of an alkyl (meth)acrylate having an alkyl group with 4 or more carbon atoms and having a polymerizable unsaturated group introduced therein, or is a macromonomer of a copolymer of polymerizable unsaturated monomers comprising a major proportion of an alkyl (meth) acrylate having an alkyl group with 4 or more carbon atoms.

5. The colored liquid according to claim 1, wherein the polymerizable unsaturated monomer (C) comprises a polyfunctional polymerizable unsaturated monomer.

6. The colored liquid according to claim 1, wherein the nonaqueous solvent comprises an aliphatic hydrocarbon solvent and/or an alicyclic hydrocarbon solvent.

7. The colored liquid according to claim 1, wherein the pigment (A) is carbon black.

8. The colored liquid according to claim 1, wherein the optical modulation system is an electrowetting system or an electrofluidic system.

9. A multi-phase liquid colored composition comprising the colored liquid according to claim 1 and a polar solvent immiscible with the colored liquid.

10. A method for using the multi-phase liquid colored composition according to claim 9, comprising:
providing the multi-phase liquid colored composition with a device having an optical modulation system; and
moving or deforming the colored liquid by an external electric field to modulate color or brightness.

11. The multi-phase liquid colored composition according to claim 9, wherein the optical modulation system is an electrowetting system or an electrofluidic system.

12. A method for using the colored liquid according to claim 1, comprising:
providing the colored liquid according to claim 1 as a colorant to form an image on a device having an optical modulation system; and
moving or deforming the colored liquid by an external electric field to modulate color or brightness.

13. The method according to claim 10, wherein the modulation system is an electrowetting system or an electrofluidic system.

* * * * *